(12) United States Patent
Maniff et al.

(10) Patent No.: US 11,864,716 B2
(45) Date of Patent: Jan. 9, 2024

(54) REMOVABLE COVER FOR A ROBOTIC CLEANING DEVICE

(71) Applicant: Maniff Creations, Inc., Leesburg, VA (US)

(72) Inventors: Jonathan Maniff, Leesburg, VA (US); Francesca Maniff, Leesburg, VA (US)

(73) Assignee: Maniff Creations, Inc., Leesburg, VA (US)

( * ) Notice: Subject to any disclaimer, the term of this patent is extended or adjusted under 35 U.S.C. 154(b) by 0 days.

(21) Appl. No.: 17/986,177

(22) Filed: Nov. 14, 2022

(65) Prior Publication Data

US 2023/0165419 A1 Jun. 1, 2023

Related U.S. Application Data

(63) Continuation of application No. 17/145,634, filed on Jan. 11, 2021, now Pat. No. 11,497,362, which is a continuation of application No. 16/794,027, filed on Feb. 18, 2020, now Pat. No. 10,888,204.

(60) Provisional application No. 62/853,949, filed on May 29, 2019.

(51) Int. Cl.
*A47L 9/00* (2006.01)
*A63H 3/00* (2006.01)
*A47L 7/00* (2006.01)

(52) U.S. Cl.
CPC .............. *A47L 9/00* (2013.01); *A47L 7/0085* (2013.01); *A63H 3/003* (2013.01); *A47L 2201/00* (2013.01)

(58) Field of Classification Search
CPC ...... A47L 2201/00; A47L 9/00; A47L 7/0085; A47L 9/0009; A63H 3/003

USPC ............... 150/165, 154; 206/457; 15/247
See application file for complete search history.

(56) References Cited

U.S. PATENT DOCUMENTS

| 1,479,151 | A | | 1/1924 | Moone |
| 2,812,900 | A | | 11/1957 | Matthews |
| 3,088,157 | A | * | 5/1963 | Aguilar ............. A47L 9/0009 15/323 |

(Continued)

FOREIGN PATENT DOCUMENTS

| EP | 2583605 A2 | 4/2013 |
| WO | 2013162094 A1 | 10/2013 |

OTHER PUBLICATIONS

MyRoomBud screenshots. Home Page (www.myroombud.com) Dec. 20, 2006. FAQ Page (www.myroombud.com/faq.html) Mar. 26, 2006. (Year: 2006).*

(Continued)

*Primary Examiner* — John K Fristoe, Jr.
*Assistant Examiner* — Jennifer Castriotta
(74) *Attorney, Agent, or Firm* — Troutman Pepper Hamilton Sanders LLP; James E. Schutz; Korbin Blunck

(57) ABSTRACT

A device for covering a plurality of different sized robotic systems. The device can include a cover sized to at least partially fit over the robotic system; one or more sidewalls extended from the cover, wherein the one or more sidewalls is configured to removably engage with each of the plurality of different sized robotic systems; and one or more apertures in the cover and/or the one or more sidewalls. The one or more apertures are selectively positioned and sized so as to prevent obstructing the one or more onboard sensors of the respective robotic system when the device is in an assembled state with the respective robotic system.

17 Claims, 6 Drawing Sheets

(56) References Cited

U.S. PATENT DOCUMENTS

| | | | | |
|---|---|---|---|---|
| 3,771,192 | A * | 11/1973 | Zaleski | A47L 7/0085 446/72 |
| 3,883,922 | A * | 5/1975 | Fleischhauer | A47L 9/2842 15/325 |
| 4,831,682 | A * | 5/1989 | White | A47L 9/009 15/246.2 |
| 4,876,762 | A * | 10/1989 | Foster | A47L 9/009 15/246.2 |
| 5,454,492 | A * | 10/1995 | Hunter | B67D 3/0009 221/96 |
| 5,868,189 | A * | 2/1999 | Jarvis | B63H 7/02 150/165 |
| 5,904,196 | A * | 5/1999 | Wickers | A47L 9/00 206/457 |
| 6,435,392 | B1 * | 8/2002 | Kennedy | A45C 11/22 224/676 |
| 6,459,955 | B1 * | 10/2002 | Bartsch | A47L 9/0009 318/587 |
| 6,883,201 | B2 | 4/2005 | Jones et al. | |
| 6,948,614 | B1 * | 9/2005 | Hall | A45C 11/329 206/38.1 |
| 7,165,289 | B1 * | 1/2007 | Gossage | B65G 53/24 15/314 |
| 7,448,113 | B2 | 11/2008 | Jones et al. | |
| 8,032,978 | B2 | 10/2011 | Haegermarck | |
| 8,656,550 | B2 | 2/2014 | Jones et al. | |
| 2004/0031121 | A1 * | 2/2004 | Martin | A47L 13/40 15/246.2 |
| 2006/0021184 | A1 | 2/2006 | Hawkins et al. | |
| 2010/0181220 | A1 * | 7/2010 | Dasara | A61B 50/00 383/42 |
| 2011/0125324 | A1 | 5/2011 | Back et al. | |

OTHER PUBLICATIONS

Chris Burns, "Roombas take on Video Game costume [Video]". (www.shashgear.com/roombas-take-on-video-game-costumes-video-16180591) Sep. 16, 2011. (Year: 2011).*

Viark Frauenfelder, "Roomba cover resembles monstrous horny toad", https://boingboing.net/2009/03/13/roombaaover-resembl_html, Mar. 13, 2009, retrieved Feb. 18, 2020.

Kristin Silva, "Incredible 8-Bit Roomba Covers with Mano Bros Themes", https://walyou.com/roomba-mario-brosi, Nov. 15, 2012, retrieved Feb. 18, 2020.

24-7 Press Release, "Entrepreneurial Kids at my RoomBud expand Roomba RoomBud costume line and distribution or 2006", https://www.24-7pressrelease.com/press-release/10521/entrepreneurial-kids-at-myroombud-expandoomba-roombud-costume-line-and-distribution-for-2006, Jan. 23, 2006, retrieved Feb. 18, 2020.

* cited by examiner

REMOVABLE COVER FOR A ROBOTIC CLEANING DEVICE

CROSS REFERENCE TO RELATED APPLICATIONS

This application is a continuation application of U.S. Non-Provisional application Ser. No. 17/145,634 filed Jan. 11, 2021, which is a continuation application of U.S. Non-Provisional application Ser. No. 16/794,027, filed Feb. 18, 2020 (now U.S. Pat. No. 10,888,204), which claims the benefit under 35 U.S.C. § 119(e) of U.S. Provisional Patent Application No. 62/853,949, filed May 29, 2019, the entire contents and substance of both are incorporated herein by reference in their entirety.

FIELD OF TECHNOLOGY

Embodiments of the present disclosure relate to a device for covering robotic cleaning devices.

BACKGROUND

Robotic cleaning devices are commonly used in residential and industrial applications today to clean an area without the aid of a human. For example, robotic cleaning devices are now commonly used to clean or care for many homeowner's floors, windows, grills, lawns, and pools. Robotic cleaning devices are also used in many industrial applications. Unfortunately, many robotic cleaning devices have a simple hard plastic cover that can be unappealing to the average user. These hard-plastic covers can become more unappealing over time due to their tendency to become scratched when bumping into, or traveling under, furniture and other obstacles. Over time, the robotic cleaning device may become undesirable simply because the hard-plastic cover has become excessively scratched, even though the robotic cleaning device itself may still function properly.

Some users have attempted to alter the appearance of their robotic cleaners by installing vinyl decals, or "skins," onto the hard-plastic cover. These skins may change the coloring of the robotic cleaning device but do little to change the overall appearance (say, from a rounded robotic cleaner to a cleaner shaped more like a sea turtle or other animal). Furthermore, these skins can also be scratched when the robotic cleaner contacts furniture or other obstacles, requiring the user to replace the skins over time.

Other users have made their own fabric covers for their robotic cleaners. However, these fabric covers have generally covered and blocked important sensors making the robotic cleaner unable to function properly. Furthermore, many of these cloth covers have covered vents necessary for cooling and vacuuming functions, causing the robotic cleaner to experience degraded performance and potentially voiding the manufacturer's warranty. Therefore, there is a need in the art for a removable cover for a robotic cleaning device that can alter the appearance of, and provide additional protection to, the hard-plastic cover while also maintaining or enhancing the designed performance of the robotic cleaner. These and other problems can be addressed by the technology disclosed herein.

SUMMARY

Accordingly, the inventors of this disclosure have recognized that there is a need for the following solution.

In some examples, a device can be for covering a variety of different sized robotic systems having one or more onboard sensors. The cover can have a cover sized to at least partially fit over the robotic system and at least one sidewall extending from the cover. In some examples, the cover can be sized to completely fit over the robotic system. The sidewall can be configured to removably engage with each of the different sized robotic systems. The cover can also have one or more apertures in the cover and/or the one or more sidewalls, the one or more apertures being selectively positioned and sized so as to prevent obstructing the one or more onboard sensors of the respective robotic system when the device is in an assembled state with the respective robotic system.

The cover can also have one or more cushions selectively positioned to protect the respective robotic system for impact during use in the assembled or operating state. The cover can also have a mesh on a rear portion of the cover near a fan of the robotic system in the assembled state, the mesh being configured to enable activity of the fan during use.

The cover can be configured to fit many shapes of robotic devices. For example, the cover can be sized to fit circular robotic systems. More specifically, the circular-shaped robotic systems can have diameters ranging between approximately 6 inches to 15 inches. The robotic system can also have a height ranging between approximately 2 to 5 inches. The cover can be sized to fit a robotic device having a generally semi-circular shape that terminates in a planar sidewall edge. The cover can be sized to fit a robotic device having a substantially polygonal shape. The cover can also be sized to fit a robotic cleaning devices having a substantially oval, hemispherical, square, rectangular, triangular, or otherwise polygonal shape, or a robotic device having a partially rounded frame with one or more flat sides (e.g., a D-shaped or horseshoe-shaped robotic cleaning system).

The cover can decorate a robotic device by having a head, one or more limbs, a body, and a tail.

The cover can be made to be a figurine.

The cover can also have a restricting device which can be one or more hook-and-loop connectors to connect to a corresponding hook-and-loop connector of the respective robotic system in the assembled state, a mechanism configured to adjust a diameter of the cover and constrict engagement between the cover and the respective robotic system in the assembled state, a drawstring, or an elastic cord configured to stretch around the respective robotic system in the assembled state.

The cover can be machine washable.

The cover can also have a transparent material positioned over a control button of the respective robotic system, or a plurality of flaps configured so a control button of the respective robotic system is externally accessible and visible by a user in the assembled state.

Another example cover can comprise a cover sized to fit a robotic cleaning device, the cover having an aperture sized to receive a sensor of the robotic cleaning device, a sidewall affixed to the cover, wherein the sidewall comprises a material to allow air to pass through, and wherein the cover and sidewall form a figurine shape; and a restricting device, wherein the restricting device is configured to adjust an outer perimeter of the sidewall to allow the device to attach to a robotic cleaning device. The restricting device can be a drawstring, a hook-and-loop fastener, a belt and buckle, a button and loop, an elastic cord, or a magnetic attachment system. The cover can have a cover further having an accessible portion for a user to access a control button of the robotic cleaning device.

Some examples can include a method of covering a robotic cleaning device. The method can include placing a cover upon a robotic cleaning device, aligning the cover with the robotic cleaning device, and connecting the cover so the cover remains on the robotic cleaning device while operational. The step of connecting the cover can include tightening the cover with a drawstring. The step of connecting can also include connecting a hook-and-loop fastener to a corresponding receiver of the robotic cleaning device, or vice versa. The step of connecting can also include connecting the cover via a belt and a buckle, a button and a loop, an elastic cord, or a magnetic attachment system.

The present disclosure will be more fully understood from the following detailed description of embodiments thereof, taken together with the drawings.

BRIEF DESCRIPTION OF THE DRAWINGS

While the specification concludes with claims, which particularly point out and distinctly claim the subject matter described herein, it is believed the subject matter will be better understood from the following description in conjunction with the accompanying drawings, in which like numerals indicate like structural elements and features in various figures. The drawings are not necessarily to scale, emphasis instead being placed upon illustrating principles of the disclosure. The figures depict one or more implementations of the inventive devices, by way of example only, not by way of limitation.

DETAILED DESCRIPTION

Figure 1:
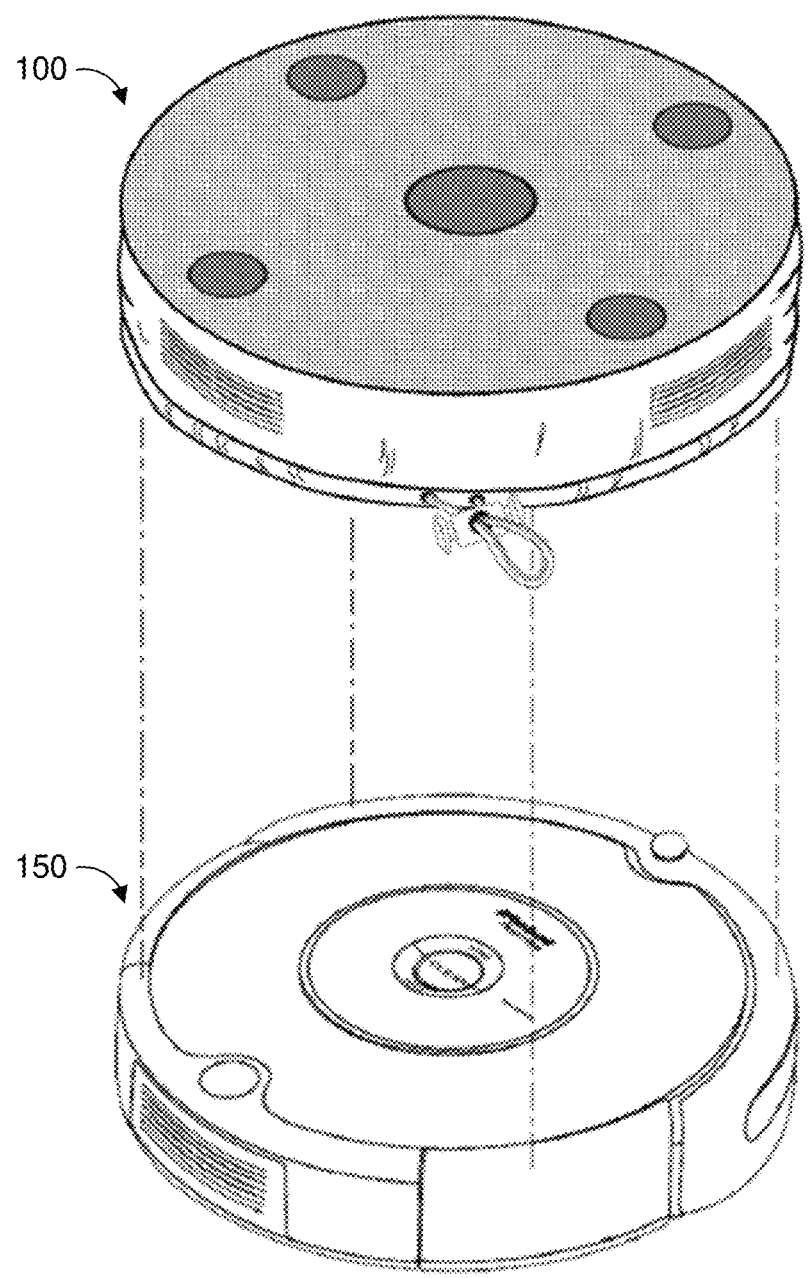
FIG. 1 is a perspective view of a device for covering a robot depicted with a vacuum robot according to an example of the present disclosure.

The disclosed technology relates to a device for covering robotic devices. More specifically, the device can be adapted to cover robotic cleaning devices such as robotic vacuums, robotic mops, robotic lawn mowers, robotic window cleaners, submersible cleaners for pools and hot tubs, or other indoor or outdoor robotic cleaning devices. The device can be removable, machine-washable, decorative, and configured to provide protection and sound dampening for the robot.

Unless defined otherwise, all terms of art, notations and other scientific terms or terminology used herein have the same meaning as is commonly understood by one of ordinary skill in the art to which this disclosure belongs.

Although certain examples of the disclosed technology are explained in detail with regard to a cover for a robotic cleaning device, it is to be understood that other examples, embodiments, and implementations of the disclosed technology are contemplated such as, for example, a cover for industrial robotic devices, a cover for robotic children's toys, a cover for robotic medical devices, or many other example robotic devices. Accordingly, it is not intended that the disclosed technology is limited in its scope to the details of construction and arrangement of components set forth in the following description or illustrated in the drawings. The disclosed technology is capable of other embodiments and of being practiced or carried out in various ways. Also, in describing the many examples, specific terminology will be resorted to for the sake of clarity.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described.

FIG. 1 is a perspective view of a device for covering a robot depicted with a vacuum robot according to an example of the present disclosure. Such robotic systems can include but not necessarily be limited to systems such as those described in U.S. Pat. No. 7,448,113 to Jones, U.S. Pat. No. 6,883,201 to Jones, U.S. Pat. No. 8,656,550 to Jones, U.S. Pat. No. 8,032,978 to Haegermarck, U.S. Patent Application No. 20110125324 to BAEK, WIPO Publication No. 2013162094 to Heo, or European Patent Application No. 2583605 Yoon, each of which are incorporated by reference herein. As shown, the device can be a cover 100 mountable on a robotic vacuum 150. Alternatively, cover 100 can be designed to be attached to other robotic cleaning devices such as a robotic mop, a robotic pool cleaner, a robotic lawn mower, a robotic window cleaner (e.g., one that cleans in a vertical orientation as it traverses windows), a robotic snow blower or snow plow, robotic sprinkler, or any other robotic device. Furthermore, the cover 100 can be adapted to integrate with robotic cleaning devices that may be voice activated or utilize artificial intelligence. Cover 100 can be modified to better adapt to each of these various applications. Cover 100 can also be configured to be adjustable and able to fit various sizes of robotic devices.

As a non-limiting example, cover 100 can be sized or adjusted to fit robotic cleaning devices ranging from 3 inches to 36 inches in diameter. However, such diameter ranges are by example only and the covers of this disclosure can be sized to fit systems smaller or larger, as needed or required. Alternatively, cover 100 can be sized or adjusted to fit robotic cleaning devices having a non-circular shape. Such as, for example, robotic cleaning devices having a substantially square, rectangular, triangular, or otherwise polygonal shape, or a robotic device having a partially rounded frame with one or more flat sides (e.g., a D-shaped robotic cleaning system). One of skill in the art will understand that the cover 100 can be configured to attach to a robotic cleaning device of any size or shape.

Cover 100 can be a protective cover designed to protect the robotic cleaner and objects the robotic cleaner may come into contact with. For example, and not limitation, cover 100 can be designed to cover a robotic vacuum cleaner 150 to protect the robot from colliding with, impacting, being scratched or otherwise defaced due to contact with other objects such as furniture, walls, and other obstacles. Similarly, because cover 100 provides a protective boundary around the robotic cleaner, cover 100 also acts to protect furniture, walls, and other obstacles the robotic cleaner may come into contact with.

Cover 100 can also provide a decorative covering to alter the appearance of the robotic cleaning device by arranging the materials of the cover 100 in a particular way, by printing an image on the cover 100, or by any other means intended to alter the appearance of the robotic cleaning device. The decorative aspect of the cover 100 can add to the user's sense of enjoyment when observing the robotic cleaning device. As an example, cover 100 can be configured to appear as an animal, a human, a character, a sports item, a pop culture reference, a logo, a simple pattern, an artistic print, a landscape or architecture scene, or any other desired decorative cover. As will be appreciated, the artistic variations of cover 100 are virtually endless. Cover 100 can be made to be decorative by dyeing, printing, weaving, sewing, gluing, or otherwise constructing fabric or other material to form a cover 100. Additionally, cover 100 can be further shaped by adding filler materials or attaching additional materials to create the desired decorative result. Alternatively, cover 100 can have additional elements added to enhance the aesthetic appearance of cover 100. For example and not limitation, cover 100 can have an electrical circuit integrated into cover 100 to illuminate lights or electronic screens and to provide additional sounds. The electrical circuit can be powered by an integrated battery or may be configured to be powered by the battery of the robotic cleaning device itself.

Because robotic cleaning devices can produce a great deal of noise while in operation, cover 100 in certain aspects advantageously is configured to dampen the sound and reduce the noise output. For example, cover 100 can be designed to dampen the noise produced by a vacuum robot 150 while in operation by muffling the sound of the motor and fan. The materials which cover 100 is made from can be specifically selected to reduce the noise produced by the robotic cleaning device. For example and not limitation, cover 100 can have acoustic foam, mass-loaded vinyl, batt insulation, batting, or any other sound-reducing material. One of skill in the art will appreciate that many materials or combinations of materials may be used to reduce the noise produced by a robotic cleaning device.

Robotic cleaning devices can often become dirty over time due to the nature of their operation. Consequently, cover 100 may become dirty and need to be washed. To help fix this issue, cover 100 can be made of a washable material, either by hand or in a machine washer. For example, cover 100 can be made entirely of fabric or other washable material so that cover 100 can be removed from the robotic cleaning device and placed in a washing machine. In this respect, cover 100 can maintain its aesthetic appearance even after having been used for a long time.

Figure 2:
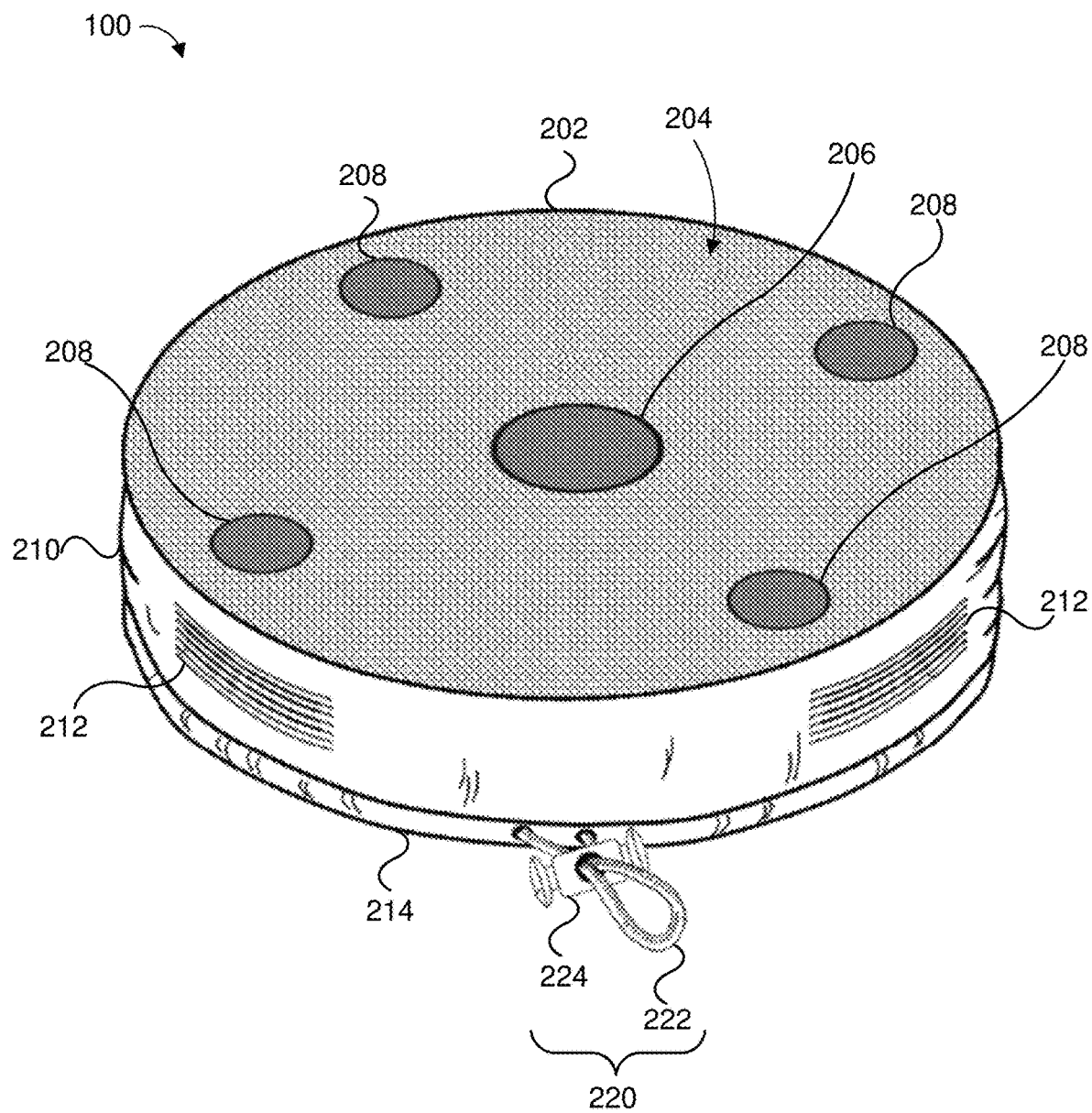
FIG. 2 is a perspective view of a device for covering a robot according to an example of the present disclosure.

FIG. 2 is a perspective view of a device for covering a robot cleaning device according to an example of the present disclosure. As shown in FIG. 2, an example of cover 100 can comprise a base cover 202 having a top surface 204, a controls access port 206, and a sensor access port 208. A sidewall 210 can be attached to the base cover 202. The sidewall 210 can comprise an air vent 212 and a fastener device pocket 214. The side wall 110 can be configured to restrict around a robot with a fastener device 220 that can comprise a drawstring 222 and a drawstring lock 224. However, drawstring 222 is merely one example mechanism for adjusting and/or tightening cover 100 about the underlying robotic cleaning system. As will become apparent, the just describe example can be modified to take various forms and be used in various applications.

As described, cover 100 can include a base cover 202. The base cover 202 can be sized and configured to fit many different robot cleaning devices such that the base cover 202 can rest upon and cover the top surface of the robot cleaning device without extending to the ground or exposing a large area of the top surface of the robotic cleaning device. As a non-limiting example, the base cover 202 can be made of fabric with the fabric patterned or dyed for decoration. The base cover 202 can also include more than one layer of fabric with other material inserted between the layers of fabric. For example, the base cover 202 can be two layers of fabric with a filler material inserted in the middle to form a desired shape. As yet another example, the cover 100 can be made of a foam, rubber, or plastic material and shaped and colored for decoration. One of skill in the art will appreciate that the base cover 202 can be made from many different material and combinations of materials.

Additionally, as discussed above in relation to cover 100 in general, the base cover 202 can be or include impact-resistant material or sound-dampening material to protect the robotic cleaning device and reduce the overall noise of the robotic cleaning device while in operation. As another example, the base cover 202 can be a water-resistant material to provide additional protection to the robotic cleaner. As yet another example, the base cover 202 can be made from material that is durable when submerged underwater for long periods of time, such as a base cover 202 installed on a robotic pool cleaning device.

As another example, the base cover 202 can have a top surface 204 comprising a hook-and-loop surface (such as Velcro®, touch fastener, hook-and-pile fastener, Slidingly Engaging Fastener, Dual Lock®, Duotec®, etc.) so that other objects can be attached to the top surface 202 interchangeably. As a non-limiting example, the user could attach a stuffed animal using hook-and-loop fastener material like that depicted in FIG. 4. Alternatively, the base cover 202 can be made of a rigid material with a top surface 204 configured to receive interlocking bricks or objects, like Legos® or Mega Bloks®, so that a user may design and create various covers for the robotic cleaning device. As one of skill in the art will appreciate, the base cover 202 can be modified for various applications and designs.

The base cover 202 can be modified to have a controls access port 206 such that a user can externally access the controls of the robotic cleaning device. For example, the controls access port 206 can be an aperture formed into the base cover 202 so that a user may see and access the controls of the robotic cleaning device. As another example, the controls access port 206 can be a transparent, or semi-transparent, material so that a user may see the controls of the robotic cleaning device and press on the transparent material to control the robotic cleaning device.

As yet another example, the controls access port 206 can be a portion of the base cover 202 formed to have a flap that can be lifted to view and access the controls of the robotic cleaning device. In this example, the flap can be kept in place with a hook-and-loop fastener (such as Velcro®, touch fastener, hook-and-pile fastener, Slidingly Engaging Fastener, Dual Lock®, Duotec®, etc.), button and loop, snap-fit fastener, magnetic fastener, or other fasteners, until the user desires to access the controls of the robotic cleaning device. The user can then lift up on the flap to access the controls of the robotic cleaning device. Alternatively, the base cover 202 may not need a controls access port 206 because the robotic cleaning device may be configured to be controlled by a remote control, a user's mobile device, voice activation, or some other device separate from the robotic cleaning device.

The base cover 202 can also have a sensor access port 208. The sensor access port 208 can be a simple aperture in the base cover 202 designed to allow a sensor of the robotic cleaning device to extend through the sensor access port 208. The sensor access port 202 can provide the robotic cleaning device with the ability to operate properly without the sensing devices being obstructed. The sensor access port 208 can be any shape to allow the sensor of the robotic cleaning device to function properly. For example and not limitation, the sensor access port 208 can be round, triangular, square, or otherwise polygonal, to ensure the sensor of the robotic cleaning device is able to function without obstruction. As another example, the sensor access port 208 can be a transparent or translucent material or a mesh material that allows the sensor of the robotic cleaning device to operate without obstruction. As yet another example, the portion of the base cover 202 nearest the sensor access port 208 can be tapered, or otherwise made thinner, to further allow the sensor of the robotic cleaning device to operate without obstruction. To ensure cover 100 is not moved to obstruct the view of the sensing device, cover 100 can have non-slip material placed near the sensors of the robotic cleaning device. Furthermore, although not shown, the sidewall 210 can have similar sensor access ports 208 to allow sensors on the side of the robotic cleaning device to similarly operate without obstruction.

Cover 100 can also have a sidewall 210. The sidewall can be attached to the base cover 202 and configured to rest along the side of the robotic cleaning device without touching the ground or hindering the operation of the robotic cleaning device. The sidewall 210 can be made from the same or similar material that the base cover 202 is made from and can similarly have apertures to allow for sensors of the robotic cleaning device to work properly. As a non-limiting example, the sidewall 210 can be made of fabric with the fabric patterned or dyed for decoration. The pattern or design of the side wall 210 can be designed to match that of the base cover 202 to extend the pattern to the sides of the robotic cleaning device. The sidewall 210 can also comprise more than one layer of fabric with other material inserted between the layers of fabric. For example, the sidewall 210 can be two layers of fabric with a filler material inserted in the middle to form a desired shape. Additionally, as discussed above in relation to cover 100 in general, the sidewall 210 can be or include impact-resistant material or sound-dampening material to protect the robotic cleaning device and reduce the overall noise of the robotic cleaning device while in operation. As another example, the sidewall 210 can be water-resistant material to provide additional protection to the robotic cleaner.

As yet another example, the sidewall 210 can be made from material that is durable when submerged underwater for long periods of time, such as a cover 100 installed on a robotic pool cleaning device. As another example, the sidewall 210 can comprise a hook-and-loop surface so that other objects can be attached to the sidewall 210 interchangeably. Alternatively, the sidewall 210 can be made of a rigid material with a top surface 204 configured to receive interlocking bricks or objects, such as Legos® or Mega Bloks®, so that a user may design and create various covers for the robotic cleaning device. As one of skill in the art will appreciate, the sidewall 210 can be modified for various applications and designs.

The sidewall 210 can have an air vent 212 to allow for the robotic cleaning device 100 to be ventilated to help ensure the robotic cleaning device 100 can operate properly. Although describe as an air vent, the air vent 212 can be adapted to be a water filter for applications where cover 100 is used to cover robotic pool cleaning devices. The air vent 212 can comprise an aperture, a mesh material, various slits cut in the sidewall 210, or rigid louvers or vents. For example, the air vent 212 can be a mesh material integrated into the sidewall 210 and positioned over an outlet of a robotic cleaning device, such as a vacuum or pool-cleaning robot.

The air vent 212 can also be slits cut into the side wall 210. The slits can be reinforced with additional stitching or other material so that the slits remain open and do not lead to additional tearing of the sidewall 210. As another example, the air vent 212 can be a hard-plastic louver attached to the sidewall 210. If the air vent 212 is a hard-plastic louver, then the air vent 212 can be configured to open when the robotic cleaning device is operating, such as when the fan of a vacuum pushes air out of a robot vacuum and provides a positive force on the hard-plastic louver, and close again when the robotic cleaning device is no longer operating. The air vent 212 can also be made to function as an air or water filter and be configured to have interchangeable filters to be replaced when depleted. If the air vent 212 is configured to be a filter, the air vent 212 can provide supplemental filtration in addition to the filters already used by the robotic cleaning device.

The sidewall 210 can be restricted around the robotic cleaning device by a fastener device 220 configured to reduce the size of the sidewall 210 and keep cover 100 in place. The fastener device 220 can be configured to restrict the sidewall 210 around the edge of the robotic cleaning device 100 in a manner that helps to keep cover 100 in place but does not restrict so tightly that any sensors, such as bump sensors or other impact sensors, are rendered useless. As depicted in FIG. 2, the fastener device 220 can comprise a drawstring 222 and a drawstring lock 224. However, the fastener device 220 can comprise any fastener device configured to keep cover 100 in place. For example and not limitation, the fastener device 220 can comprise a drawstring 222, elastic cord, or additional material of the sidewall 210 intended to be used as part of the fastener device 220. The fastener device 220 can further comprise a drawstring lock 224, magnetic fasteners, hook-and-loop fasteners (such as Velcro®, touch fastener, hook-and-pile fastener, Slidingly Engaging Fastener, Dual Lock®, Duotec®, etc.), a button and loop, a snap-fit connector, sticky tape or other sticky material, female to male connectors, hooks, a belt and buckle, or any other form of fastening device configured to help keep cover 100 in place on the robotic cleaning device. The sidewall 210 can additionally have a fastener device pocket 214 configured to receive a portion of a fastener system. The fastener device pocket 214 can be a simple portion of the sidewall 212 fabric folded over and stitched to create a pocket extending around the circumference of the sidewall 210 or can be loops affixed to the sidewall to hold a fastener device 220. For example, the fastener device pocket 214 can be configured to receive a drawstring 222 or elastic cord to allow the sidewall 210 to restrict around the robotic cleaning device and keep cover 100 in place.

Figure 3:
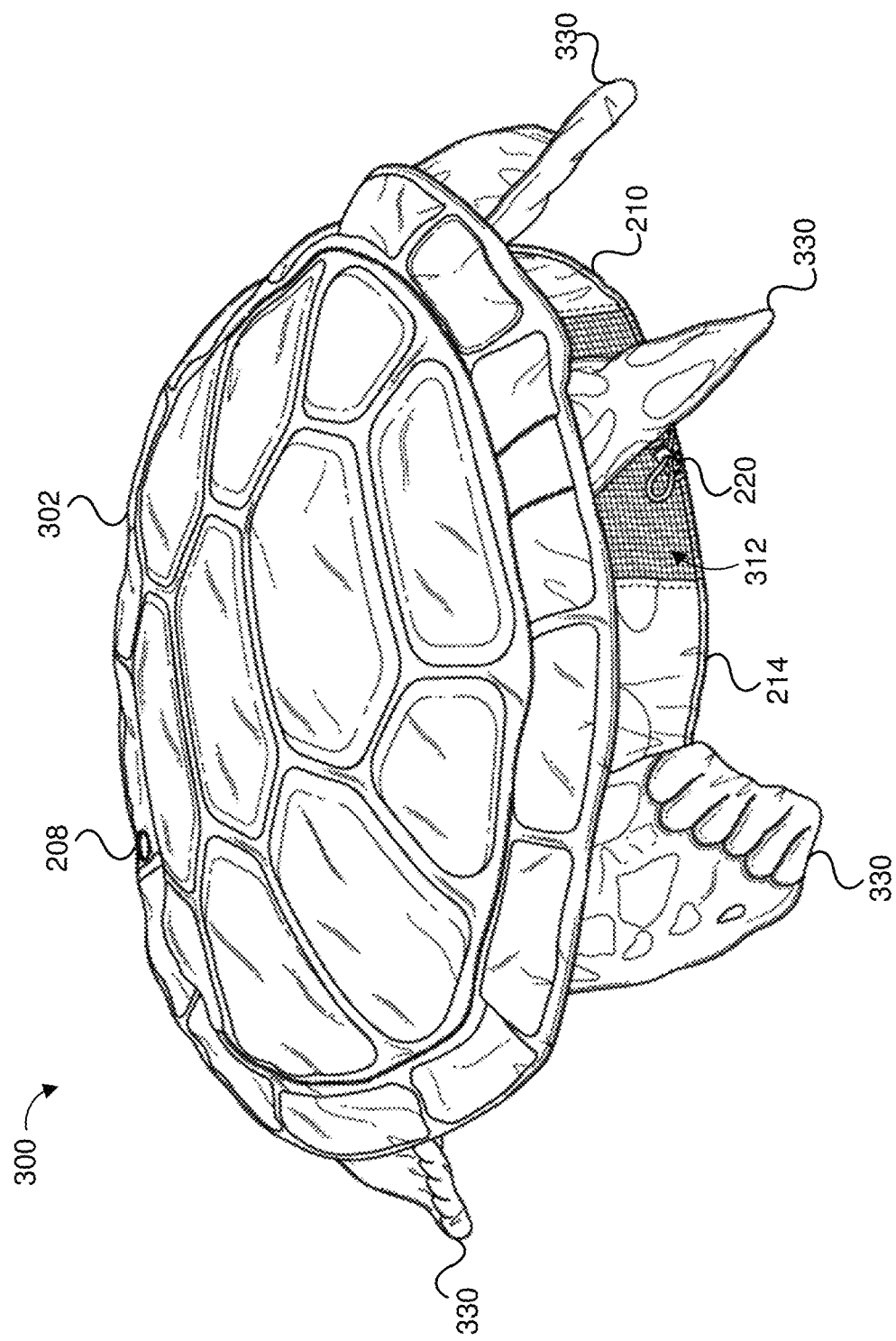
FIG. 3 is a diagram of an exemplary device for covering a robot being shaped as a turtle according to an example of the present disclosure.

As another example, FIG. 3 is a diagram of an exemplary device for covering a robot being shaped as a turtle according to an example of the present disclosure. Although FIG. 3 shows a specific example of a cover 100, the turtle-shaped cover 300 is offered merely as an example and should not be considered as limiting. One of skill in the art will appreciate that the turtle-shaped cover 300 could be modified to incorporate artistic designs that include an animal, a human, a character, a sports item, a pop culture reference, a logo, a simple pattern, an artistic print, a landscape or architecture scene, or any other desired decorative cover.

As shown in FIG. 3, the turtle-shaped cover 300 can alter the appearance of a robotic cleaning device when mounted on the robotic cleaning device. The turtle-shaped cover 300 can include a cover 302 shaped and colored to appear as a turtle. Furthermore, the turtle-shaped cover 300 can have a sensor access port 208, a sidewall 210, a fastener device pocket 214, and a fastener device 220. Each of these elements can be the same as those previously described. The turtle-shaped cover 300 can additionally have a mesh air vent 312 and decorative attachments 330. The mesh air vent 312 can be the same, or similar to, the air vent 212 described above. The decorative attachments 330 can be positioned, sized, shaped, and colored to give cover 100 the overall appearance of a turtle.

Furthermore, the decorative attachments 330 can be positioned in advantageous locations to provide further cushioning for impact. For example, the decorative attachments 330 positioned near the front (in this example, the front limbs of the turtle) can be positioned near the outer front edge to provide the robotic cleaning device with additional protection as the robotic cleaning device cleans around obstacles. Many robotic cleaning devices, such as robotic vacuum cleaners, tend to contact obstacles with the front edge, and particularly, the outer front edge. Therefore, having decorative attachments 330 strategically positioned to reduce the impact of the robotic cleaning device when it encounters an obstacle can help to provide further protection for the robotic cleaning device.

Figure 4:
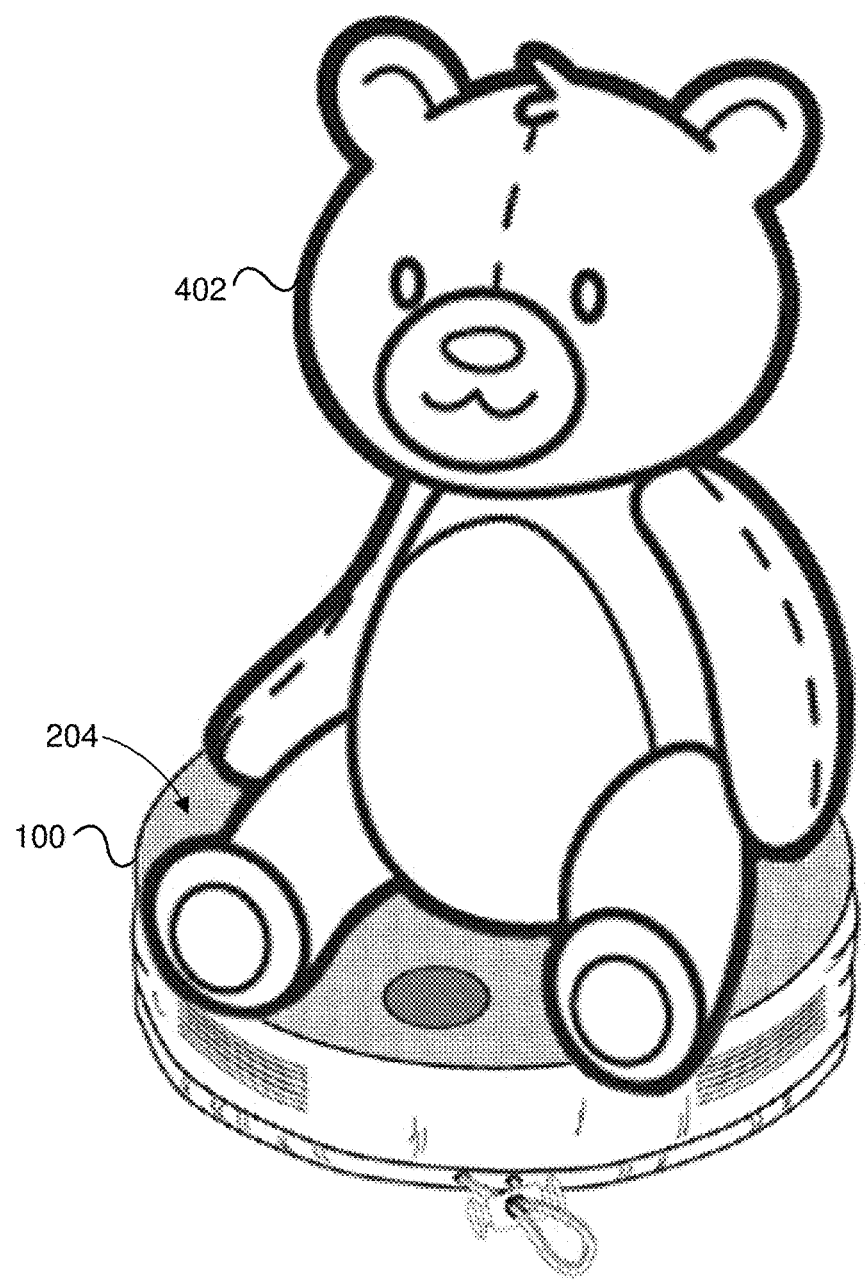
FIG. 4 is a diagram of an exemplary device for covering a robot having a teddy bear attached thereto according to an example of the present disclosure.

FIG. 4 is a diagram of an exemplary device for covering a robot having a teddy bear 402 attached thereto according to an example of the present disclosure. As described above, the base cover 202 of cover 100 can have a top surface 204 comprising a hook-and-loop fastener (such as Velcro®, touch fastener, hook-and-pile fastener, Slidingly Engaging Fastener, Dual Lock®, Duotec®, etc.) surface to allow the user to add attachments to cover 100. FIG. 4 provides an illustration of a specific example of a user attaching a teddy bear 402 to the top surface 204 of cover 100. The teddy bear 402 is offered merely for example and should not be construed as limiting. For example, the top surface 204 could be configured to attach with any object or design a user desires to attach to cover 100. For example, and not limitation, a user could attach any stuffed animal, figurine, sports object, memorabilia, picture, or other object as desired. Furthermore, the item attached may protrude from the surface, like the teddy bear 402 shown in FIG. 4, or it may have a low profile to allow the robotic cleaning device to clean under furniture and other objects. For example, the cover 100 could be designed with a top surface 204 configured to receive several interchangeable designs that can be quickly replaced. In one example, the several interchangeable designs can be attachments having a low profile and being shaped as various sports items. For example, a user can quickly change the appearance of the robotic cleaning device to appear as a basketball during March Madness® or as a baseball during the World Series®. Alternatively, as described above, the top surface 204 can comprise a rigid material configured to receive interlocking bricks or objects, such as Legos® or Mega Bloks®, so that a user may design and create various covers for the robotic cleaning device. Each of these examples are offered merely for illustrative purposes and should not be construed as limiting. One of skill in the art will appreciate that cover 100 can be modified to include various designs to provide both aesthetic appeal and protection to the robotic cleaning device.

Figure 5A:
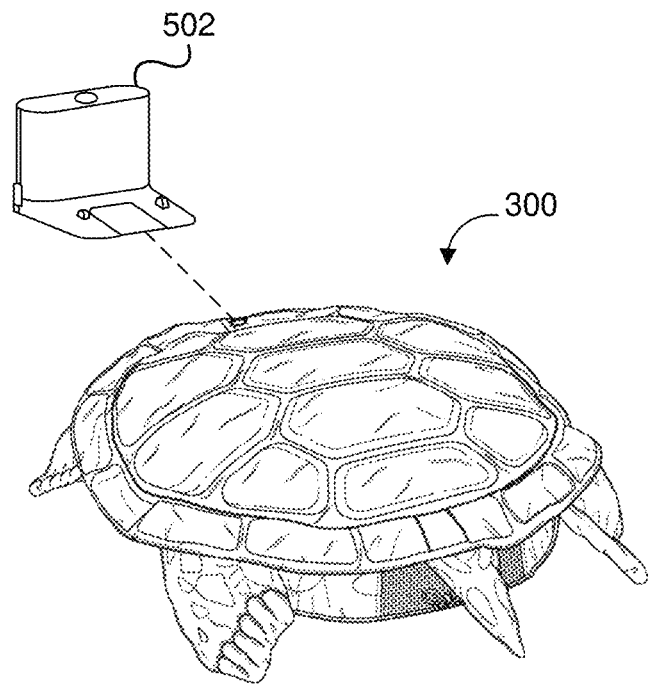
FIG. 5A and FIG. 5B depict a docking station and a robotic cleaning device having a turtle-shaped cover according to an example of the present disclosure.
Figure 5B:
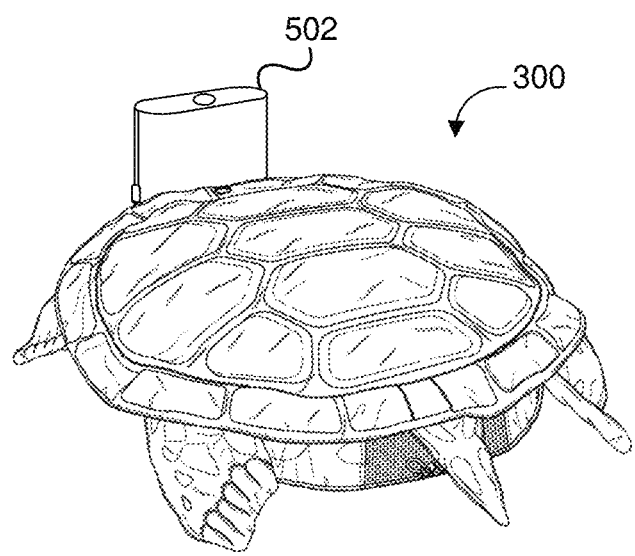

FIG. 5A and FIG. 5B depict a docking station 502 and a robotic cleaning device having a turtle-shaped cover 300 mounted thereon. The docking station 502 can provide a charge to the internal battery of the robotic cleaning device. The docking station 502 shown in FIG. 5A and FIG. 5B is an example of a docking station, but the docking station 502 can be any form of docking station configured to be used with a robotic cleaning device. In FIG. 5A, the robotic cleaning device with the turtle-shaped cover 300 mounted thereon is depicted as being separate from the docking station 502. When in operation, the robotic cleaning device with the turtle-shaped cover 300 mounted thereon would dismount from the docking station 502 and perform its cleaning function. When the robotic cleaning device with the turtle-shaped cover 300 mounted thereon has completed its cleaning function or has a low battery, the robotic cleaning device with the turtle-shaped cover 300 mounted thereon would return to the docking station 502 to resume charging. As depicted in FIG. 5B, the robotic cleaning device with the turtle-shaped cover 300 mounted thereon is capable of docking with the docking station 502 to receive a charge even with the turtle-shaped cover 300 mounted thereon. Therefore, the user is not required to remove turtle-shaped cover 300 to allow the robotic cleaning device to dock with the docking station 502. Although shown with the turtle-shaped cover 300 mounted on the robotic cleaning device, one of skill in the art will understand that the cover 100 can take any shape as previously described and still be configured to dock with the docking station 502. Furthermore, the cover 100 can be adapted to remain on any type of robotic cleaning device previously described while the robotic cleaning device is docked with any type of docking station 502.

Figure 6:
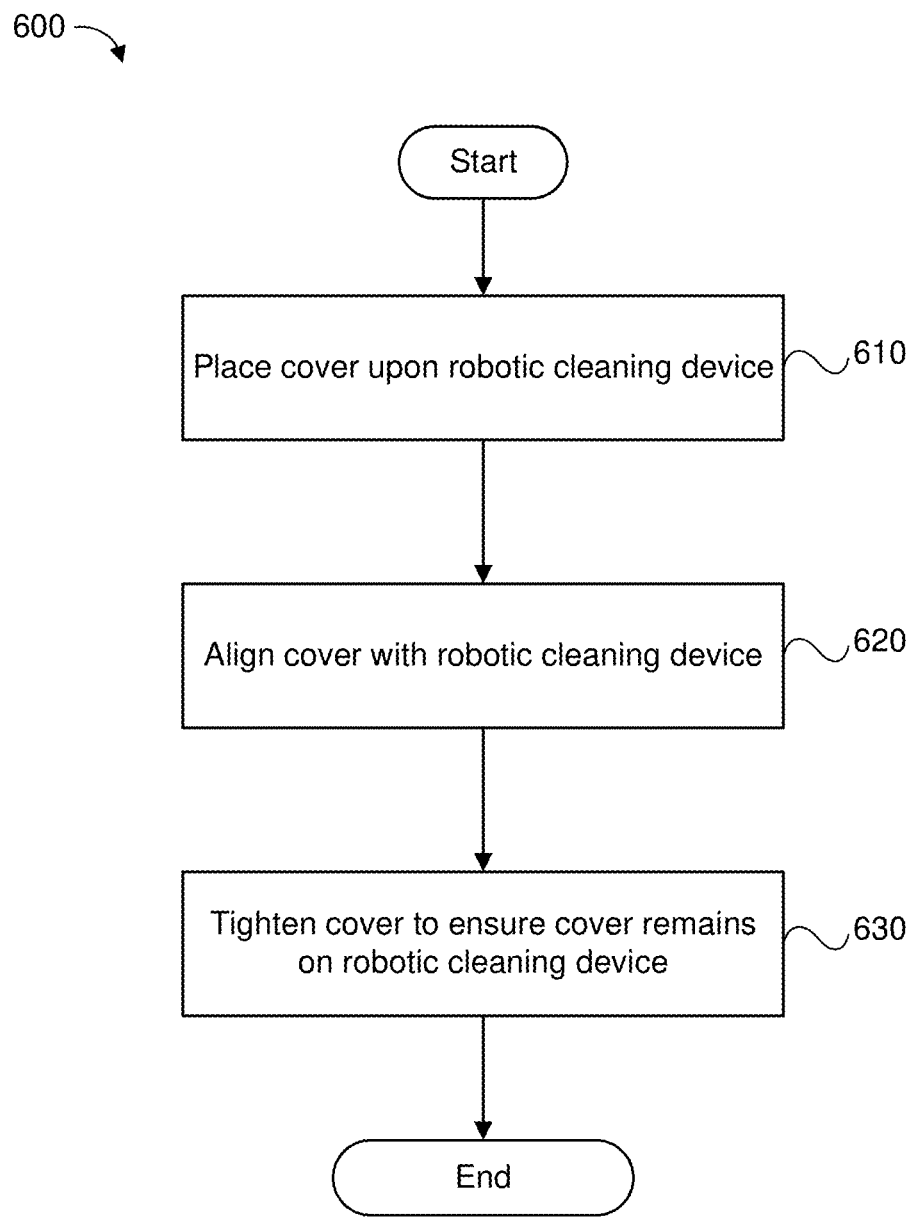
FIG. 6 depicts a graphical overview of one method according to this disclosure.

FIG. 6 depicts a method 600 including 610 placing a cover upon a robotic cleaning device; 620 aligning the cover with the robotic cleaning device; and 630 tightening the cover so the cover remains on the robotic cleaning device during operation (e.g., when being used to execute a cleaning module). Method 600 is offered merely for illustrative purposes and one of skill in the art will understand that the steps may be rearranged or modified for the particular application. For example, and not limitation, the step of 620 aligning the cover with the robotic cleaning device can occur before the step of 610 placing a cover upon a robotic cleaning device rather than after it as shown. Furthermore, the step of 630 tightening the cover can be varied depending on the application. For example, and not limitation, the step of 630 tightening can include connecting opposite ends of a fastening device or stretching and releasing an elastic cord to ensure the cover remains on the robotic cleaning device. The step of 630 tightening can include one or more of the use of a drawstring, a hook-and-loop fastener (such as Velcro®, touch fastener, hook-and-pile fastener, Slidingly Engaging Fastener, Dual Lock®, Duotec®, etc.), a belt and buckle, a button and loop, an elastic cord, or a magnetic attachment system.

The definitions of the words or elements of the following claims are, therefore, defined in this specification to not only include the combination of elements which are literally set forth. It is also contemplated that an equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device for covering a robotic system, comprising:
   a cover sized to at least partially fit over the robotic system, the cover comprising a water-resistant material;
   a sidewall extended from the cover and configured to removably engage with the robotic system;
   an aperture in the cover configured to align with an outlet of the robotic system in an assembled state, the aperture being configured to permit fluid to flow therethrough during use;
   a louver positioned at the aperture; and
   a mechanism configured to secure the cover and sidewall to the robotic system and constrict engagement between the device and the robotic system in the assembled state.

2. The device of claim 1, wherein the water-resistant material is configured to be durable when submerged underwater.

3. The device of claim 1, wherein the cover further comprises a sound-dampening material configured to reduce an overall noise of the robotic system while in operation.

4. The device of claim 1, further comprising one or more cushions selectively positioned to protect the robotic system from impact during use in the assembled state.

5. The device of claim 1, further comprising one or more hook-and-loop connectors to connect to a corresponding hook-and-loop connector of the robotic system in the assembled state.

6. The device of claim 1, wherein the mechanism comprises a drawstring.

7. The device of claim 1, wherein the mechanism comprises an elastic cord configured to stretch around the robotic system in the assembled state.

8. The device of claim 1, wherein the device is machine washable.

9. The device of claim 1, wherein the cover further comprises a transparent material positioned over a control device of the robotic system.

10. The device of claim 1, wherein the cover further comprises a flap configured so a control device of the robotic system is externally accessible and visible by a user in the assembled state.

11. A device for covering a robotic system, comprising:
    a cover sized to at least partially fit over the robotic system, the cover comprising a sound-dampening material configured to reduce an overall noise of the robotic system while in operation;

a sidewall extended from the cover and configured to removably engage with the robotic system;

an aperture in the cover configured to align with an outlet of the robotic system in an assembled state, the aperture being configured to permit fluid to flow therethrough during use;

a louver positioned at the aperture; and a mechanism configured to secure the cover and sidewall to the robotic system and constrict engagement between the device and the robotic system in the assembled state.

12. The device of claim 11, wherein the sound-dampening material comprises at least one of acoustic foam, mass-loaded vinyl, batt insulation, and batting.

13. The device of claim 12, wherein the cover further comprises:

a head;

a body; and one or more limbs.

14. A method of manufacturing a device for covering a robotic system, the method comprising:

providing a cover, the cover being sized to fit a robotic system;

attaching a sidewall to the cover, the sidewall extending from the cover and being sized to at least partially cover a side of the robotic system;

attaching to the sidewall a mechanism configured to adjust an outer perimeter of the sidewall;

forming an aperture in the sidewall, the aperture being positioned to correspond to an outlet of the robotic system; and positioning a louver at the aperture.

15. The method of claim 14 further comprising forming a flap in the cover, the flap being positioned to correspond to a control device of the robotic system.

16. The method of claim 14, wherein at least a portion of the cover comprises a transparent material.

17. The method of claim 14 further comprising attaching a head, a body, and one or more limbs to the cover.

* * * * *